(12) United States Patent
Ling

(10) Patent No.: US 11,047,234 B2
(45) Date of Patent: Jun. 29, 2021

(54) VEHICLE BODY UTILIZED IN ROCKBREAKER, ROCKBREAKER AND ROCK BREAKING METHOD

(71) Applicant: Chengdu Lieshizhe Rock-Breaking Technology LLC., Sichuan (CN)

(72) Inventor: Xijia Ling, Sichuan (CN)

(73) Assignee: CHENGDU LIESHIZHE ROCK-BREAKING TECHNOLOGY LLC, Chengdu (CN)

( * ) Notice: Subject to any disclaimer, the term of this patent is extended or adjusted under 35 U.S.C. 154(b) by 145 days.

(21) Appl. No.: 16/325,050

(22) PCT Filed: Aug. 1, 2017

(86) PCT No.: PCT/CN2017/095487
§ 371 (c)(1),
(2) Date: Feb. 12, 2019

(87) PCT Pub. No.: WO2018/028477
PCT Pub. Date: Feb. 15, 2018

(65) Prior Publication Data
US 2020/0355074 A1 Nov. 12, 2020

(30) Foreign Application Priority Data

Aug. 12, 2016 (CN) .......................... 201610660207.0
Aug. 12, 2016 (CN) .......................... 201610660208.5
(Continued)

(51) Int. Cl.
*E21C 41/00* (2006.01)
*E21C 41/26* (2006.01)
(Continued)

(52) U.S. Cl.
CPC .............. *E21C 41/26* (2013.01); *E02F 3/966* (2013.01); *E21C 27/20* (2013.01); *E21C 29/22* (2013.01)

(58) Field of Classification Search
CPC ....................................................... E21C 41/26
See application file for complete search history.

(56) References Cited

U.S. PATENT DOCUMENTS 1,596,341 A * 8/1926 Dormoy .................. B63B 35/00
299/37.3
2,681,231 A 6/1954 Kondracki
(Continued)

FOREIGN PATENT DOCUMENTS

| CN | 203189017 U | 9/2013 |
|---|---|---|
| CN | 103343688 A | 10/2013 |

(Continued)

OTHER PUBLICATIONS

Extended European Search Report issued in copending European Application No. 17838607.4 dated May 29, 2020.
(Continued)

*Primary Examiner* — Janine M Kreck
(74) *Attorney, Agent, or Firm* — Dinsmore and Shohl, LLP

(57) ABSTRACT

Disclosed are a vehicle body utilized in a rockbreaker, a rockbreaker, and a rock breaking method. A rock breaking operation area is configured to pass through the vehicle body and in a direction perpendicular to and above the ground. An operation area of a rockbreaker arm is arranged within a vehicle range.

9 Claims, 5 Drawing Sheets

(30) Foreign Application Priority Data

Aug. 12, 2016 (CN) .......................... 201610660211.7
Aug. 12, 2016 (CN) .......................... 201610660500.7
Aug. 12, 2016 (CN) .......................... 201610660501.1

(51) Int. Cl.
*E02F 3/96* (2006.01)
*E21C 27/20* (2006.01)
*E21C 29/22* (2006.01)

(56) References Cited

U.S. PATENT DOCUMENTS

| | | | | |
|---|---|---|---|---|
| 3,712,398 | A | * | 1/1973 | Althaus .................. E02F 9/024 |
| | | | | 180/9.48 |
| 4,640,551 | A | | 2/1987 | Marten |
| 5,559,725 | A | * | 9/1996 | Nielson .................... E02F 3/16 |
| | | | | 37/348 |
| 8,061,439 | B2 | | 11/2011 | Nelson |
| 2014/0224555 | A1 | | 8/2014 | Qian et al. |
| 2016/0097238 | A1 | | 4/2016 | Marek |

FOREIGN PATENT DOCUMENTS

| | | | |
|---|---|---|---|
| CN | 104179502 | A | 12/2014 |
| CN | 106050229 | A | 10/2016 |
| CN | 106089197 | A | 11/2016 |
| CN | 106089198 | A | 11/2016 |
| CN | 106194172 | A | 12/2016 |
| CN | 106285670 | A | 1/2017 |
| CN | 106869925 | A | 6/2017 |
| CN | 106979010 | A | 7/2017 |
| EP | 0080802 | A1 * 6/1983 ............... E02F 9/20 |
| EP | 0080802 | A1 | 6/1983 |
| GB | 2368358 | A | 1/2002 |
| JP | 09195661 | A | 7/1997 |
| WO | 2013061075 | A1 | 5/2013 |

OTHER PUBLICATIONS

Examination Report issued in copending Indian Application No. 201927009088 dated Jun. 1, 2020.
International Search Report and Written Opinion for PCT/CN2017/095487 dated Feb. 15, 2018, 9 pages.

* cited by examiner

VEHICLE BODY UTILIZED IN ROCKBREAKER, ROCKBREAKER AND ROCK BREAKING METHOD

CROSS-REFERENCE TO RELATED APPLICATIONS

The present application claims priority of China Patent application No. 201610660207.0 titled "VEHICLE FOR ROCK BREAKER" and filed on Aug. 12, 2016, China Patent application No. 201610660208.5 titled "ROCK BREAKING METHOD" and filed on Aug. 12, 2016, China Patent application No. 201610660211.7 titled "ROCK BREAKER" and filed on Aug. 12, 2016, China Patent application No. 201610660500.7 titled "ROCK BREAKING METHOD OF ROCK BREAKER" and filed on Aug. 12, 2016, and China Patent application No. 201610660501.1 titled "GRAVITY CENTER TYPE ROCK BREAKER" and filed on Aug. 12, 2016, the content of which is incorporated in its entirety as portion of the present application by reference herein.

TECHNICAL FIELD

The present disclosure relates to a technical field of mining technology, especially relates to a rock breaking technology, in particular to a vehicle for a rock breaker, a rock breaker, and a rock breaking method of a rock breaker.

BACKGROUND

Rock breaking is a process in which some rock masses are separated from the mother body and broken into rock blocks during a mining work. In the existing art, there are four kinds of rock breaking methods, including explosive breaking, mechanical breaking, water jet breaking and thermal breaking. In terms of the abovementioned four methods, mechanical breaking is widely used because of its high safety and good breaking effect, especially in rock formations where hardness is not very high, and a ripper is widely used. In the actual application process, the ripper's carriers (such as excavators, bulldozers, etc.) cannot fully utilize their own weight due to their own structural characteristics, and are inefficient and energy intensive.

SUMMARY

A first aspect of the present invention aims to provide a vehicle for a rock breaker, which can fully utilize the weight of the vehicle to enhance the rock breaking effect of the rock arm, and allow the rock arm to perform rock breaking around the gravity center of the rock breaker, so as to further improve the rock breaking efficiency.

A second aspect of the present invention aims to provide a rock breaker, which can fully utilize the weight of the vehicle to enhance the rock breaking effect of the rock arm, and allow the rock arm to perform rock breaking around the gravity center of the rock breaker, so as to further improve the rock breaking efficiency.

A third aspect of the present invention aims to provide a rock breaking method, which can fully utilize the weight of the vehicle to enhance the rock breaking effect of the rock arm, and allow the rock arm to perform rock breaking around the gravity center of the rock breaker, so as to further improve the rock breaking efficiency.

A fourth aspect of the present invention aims to provide a gravity center type rock breaker, which can fully utilize the weight of the vehicle to enhance the rock breaking effect of the rock arm, and allow the rock arm to perform rock breaking around the gravity center of the rock breaker, so as to further improve the rock breaking efficiency.

A fifth aspect of the present invention aims to provide a rock breaking method of a rock breaker, which can fully utilize the weight of the vehicle to enhance the rock breaking effect of the rock arm, and allow the rock arm to perform rock breaking around the gravity center of the rock breaker, so as to further improve the rock breaking efficiency.

The embodiments of the invention are implemented by the following technical solutions:

A vehicle for a rock breaker, wherein the vehicle is provided with a rock breaking working region penetrating the vehicle in a direction perpendicular to a ground.

Furthermore, the vehicle comprises a traveling mechanism, frames, and a connection block, the frames are symmetrically disposed on the traveling mechanism, the connection block is fixed between the frames, and the rock breaking working region refers to a hollow region formed at inner sides of the frames and the connection block.

Furthermore, the connection block is provided with a weight balancing object therein.

Furthermore, an area of the rock breaking working region is 7-50 square meters.

Furthermore, the connection block is provided with a rotating member for connecting a rock arm.

Furthermore, a lower portion of the vehicle is provided with a hydraulic support mechanism, the hydraulic support mechanism includes four support portions, and the four support portions are respectively connected to the lower portion of the vehicle.

Furthermore, the frames are provided with a maintenance opening.

Furthermore, the connection block is fixedly connected to the frames through a bolt.

Furthermore, the traveling mechanism comprises two sets of caterpillar traveling mechanisms, the frames are symmetrically connected to the two sets of caterpillar traveling mechanisms.

Furthermore, the traveling mechanism comprises four sets of caterpillar traveling mechanisms, the frames are symmetrically connected to the four sets of caterpillar traveling mechanisms.

A rock breaker, including a vehicle and a rock arm, the vehicle is provided with a rock breaking working region penetrating the vehicle in a direction perpendicular to a ground, the rock arm is connected to the vehicle, and a rock breaking portion of the rock arm is configured to freely move in the rock breaking working region through a control mechanism.

Furthermore, the vehicle comprises a traveling mechanism, frames, and a connection block, the frames are symmetrically disposed on the traveling mechanism, the connection block is fixed between the frames, and the rock arm is connected to the connection block.

Furthermore, the rock breaking working region refers to a hollow region formed at inner sides of the frames and the connection block.

Furthermore, the connection block is provided with a weight balancing object therein.

Furthermore, an area of the rock breaking working region is 7-50 square meters.

Furthermore, the rock arm is connected to the connection block through a rotating shaft.

Furthermore, the rock breaker further includes a hydraulic support mechanism and a control mechanism, the control mechanism is fixed on an upper portion of the vehicle, the hydraulic support mechanism is fixed on a lower portion of the vehicle, the control mechanism is configured for controlling movements of the hydraulic support mechanism, the rock arm, and the traveling mechanism.

Furthermore, the frames are provided with a maintenance opening.

Furthermore, the traveling mechanism comprises two sets of caterpillar traveling mechanisms, the frames are symmetrically connected to the two sets of caterpillar traveling mechanisms.

Furthermore, the traveling mechanism comprises four sets of caterpillar traveling mechanisms, the frames are symmetrically connected to the four sets of caterpillar traveling mechanisms.

A rock breaking method, comprising:

A: driving or moving a rock breaker provided with a rock breaking working region to a rock region to be broken, such that the rock breaking working region is located above the rock region to be broken, wherein the rock breaking working region is a hollow region penetrating a vehicle of the rock breaker and perpendicular to a ground;

B: operating the rock arm, controlling a rock breaking portion on the rock arm to move downward in the rock breaking working region;

C: the rock breaking portion of the rock arm breaking a rock in the rock breaking working region.

Furthermore, in A, after the rock breaking operation area being located above the rock region to be broken, the rock breaker is supported by a hydraulic support mechanism.

Furthermore, in A, in a case where the rock breaker does not move, an area of the rock breaking working region is 7-50 square meters.

Furthermore, the rock breaker includes a vehicle and a rock arm, the vehicle comprises a traveling mechanism, frames, and a connection block, the frames are symmetrically disposed on the traveling mechanism, the connection block is fixed between the frames, and a rock breaking working region refers to a hollow region formed at inner sides of the frames and the connection block, and the rock arm is connected to the connection block, a rock breaking portion of the rock arm is configured to freely move in the rock breaking working region through a control mechanism.

Furthermore, the connection block is provided with a weight balancing object therein.

Furthermore, the connection block is provided with a maintenance opening.

Furthermore, the rock arm is connected to the connection block through a rotating shaft.

Furthermore, the connection block is fixedly connected to the frames through a bolt.

Furthermore, the traveling mechanism comprises two sets of caterpillar traveling mechanisms, the frames are symmetrically connected to the two sets of caterpillar traveling mechanisms.

Furthermore, the traveling mechanism comprises four sets of caterpillar traveling mechanisms, the frames are symmetrically connected to the four sets of caterpillar traveling mechanisms.

A gravity center type rock breaker, including a vehicle and a rock arm, the vehicle is provided with a rock breaking working region penetrating the vehicle in a direction perpendicular to a ground, the rock arm is connected to the connection block, a rock breaking portion of the rock arm is configured to freely move in the rock breaking working region through a control mechanism, the vehicle is provided with a telescoping mechanism configured for adjusting an area of the rock breaking working region.

Furthermore, the vehicle comprises a traveling mechanism and frames, the frames are symmetrically disposed on the traveling mechanism, the telescoping mechanism is disposed between the frames and configured for adjusting the area of the rock breaking working region.

Furthermore, the rock breaking working region refers to a hollow region formed at inner sides of the frames and the telescoping mechanism.

Furthermore, a number of the frames is two, and the vehicle further comprises two sets of telescoping mechanisms, each of the two sets of the telescoping mechanisms comprises a cylinder and a telescoping block, two ends of the telescoping block are respectively in a sliding connection with the frames, the cylinder is fixed on one of the frames, and a piston rod of the cylinder is fixedly connected with the other one of the frames.

Furthermore, the frames are provided with a weight balancing block thereon.

Furthermore, there are three weight balancing blocks, and the three balancing blocks are respectively fixed on the frames of the vehicle.

Furthermore, an area of the rock breaking working region is 6-30 square meters.

Furthermore, the rock arm is connected to the connection block through a rotating shaft.

Furthermore, the frames are provided with an access door configured for the telescoping mechanism.

Furthermore, the gravity center type rock breaker further includes a control mechanism and a hydraulic support mechanism, the control mechanism is fixed on an upper portion of the vehicle, the hydraulic support mechanism is fixed on a lower portion of the vehicle, the control mechanism is configured for controlling operations of the hydraulic support mechanism, the rock arm, and the traveling mechanism.

A rock breaking method of a rock breaker, comprising:

A: driving or moving a rock breaker provided with a rock breaking working region to a rock region to be broken, such that the rock breaking working region is located above the rock region to be broken, frames of a vehicle of the rock breaker is connected with a telescoping mechanism configured for adjusting a distance between the frames, wherein the rock breaking working region is a hollow region penetrating the vehicle of the rock breaker and perpendicular to a ground;

B: operating the rock arm, controlling a rock breaking portion on the rock arm to move downward in the rock breaking working region;

C: the rock breaking portion of the rock arm breaking a rock in the rock breaking working region.

Furthermore, in A, after the rock breaking operation area being located above the rock region to be broken, the rock breaker is supported by a hydraulic support mechanism.

Furthermore, in A, in a case where the rock breaker does not move, an area of the rock breaking working region is 6-30 square meters.

Furthermore, the rock breaker includes a vehicle and a rock arm, the vehicle comprises a traveling mechanism and frames, the frames are symmetrically disposed on the traveling mechanism, a telescoping mechanism is fixed between the frames, and a rock breaking working region refers to a hollow region formed at inner sides of the frames and the telescoping mechanism, and the rock arm is connected to the frames, a rock breaking portion of the rock arm is configured to freely move in the rock breaking working region through a control mechanism.

Furthermore, a number of the frames is two, and the vehicle further comprises two sets of telescoping mechanisms, each of the two sets of the telescoping mechanisms comprises a cylinder and a telescoping block, two ends of the telescoping block are respectively in a sliding connection with the two frames, the cylinder is fixed on one of the frames, and a piston rod of the cylinder is fixedly connected with the other one of the frames.

Furthermore, the traveling mechanism comprises two sets of caterpillar traveling mechanisms, the frames are symmetrically connected to the two sets of caterpillar traveling mechanisms.

Furthermore, the frames are provided with a weight balancing block thereon.

Furthermore, there are three weight balancing blocks, and the three balancing blocks are respectively fixed on the frames of the vehicle.

Furthermore, the rock arm is connected to the frames through a rotating shaft.

Furthermore, the frames are provided with an access door configured for the telescoping mechanism.

The embodiments of the present disclosure at least include the following advantages and favorable effects:

The vehicle for a rock breaker provided by the embodiments of the present invention, the rock breaking working region penetrates the vehicle and is disposed in a direction perpendicular to the ground, and this structure allows a working region of the rock arm to fall within a range of the vehicle. The rock breaker adopting the vehicle can fully utilize the weight of the rock breaker to enhance the rock breaking effect of the rock arm, and allow the rock arm to perform rock breaking around the gravity center of the rock breaker, which is beneficial to improving the construction efficiency. At the same time, in the case of ensuring a downward shearing force of the rock arm, it is possible to minimize the energy loss of useless work without lifting an arm having a relatively large weight, thereby reducing the energy consumption of rock breaking.

The rock breaker provided by the embodiments of the present invention, the rock breaking working region penetrates the vehicle and is disposed in a direction perpendicular to the ground, and this structure allows a working region of the rock arm to fall within a range of the vehicle. Thus, the weight of the rock breaker can be fully utilized to enhance the rock breaking effect of the rock arm, and allow the rock arm to perform rock breaking around the gravity center of the rock breaker, which is beneficial to improving the construction efficiency. At the same time, in the case of ensuring a downward shearing force of the rock arm, it is possible to minimize the energy loss of useless work without lifting an arm having a relatively large weight, thereby reducing the energy consumption of rock breaking.

The rock breaking method provided by the embodiments of the present invention can fully utilize the weight of the rock breaker to enhance the rock breaking effect of the rock arm, and allow the rock arm to perform rock breaking around the gravity center of the rock breaker, so as to improve the construction efficiency.

The gravity center type rock breaker provided by the embodiments of the present caterpillar, the rock breaking working region penetrates the vehicle and is disposed in a direction perpendicular to the ground, and this structure allows a working region of the rock arm to fall within a range of the vehicle. Thus, the weight of the rock breaker can be fully utilized to enhance the rock breaking effect of the rock arm, and allow the rock arm to perform rock breaking around the gravity center of the rock breaker, which is beneficial to improving the construction efficiency. At the same time, in the case of ensuring a downward shearing force of the rock arm, it is possible to minimize the energy loss of useless work without lifting an arm having a relatively large weight, thereby reducing the energy consumption of rock breaking.

The rock breaking method of a rock breaker provided by the embodiments of the present caterpillar can fully utilize the weight of the rock breaker to enhance the rock breaking effect of the rock arm, and allow the rock arm to perform rock breaking around the gravity center of the rock breaker, so as to improve the construction efficiency.

BRIEF DESCRIPTION OF THE DRAWINGS

The abovementioned objects and other objects, features, and advantages of the present disclosure will become more apparent by describing the embodiments of the present disclosure in a more detailed way in connection with the drawings. In the embodiments of the present disclosure, the same reference numeral represents the same component or part.

Figure 1:
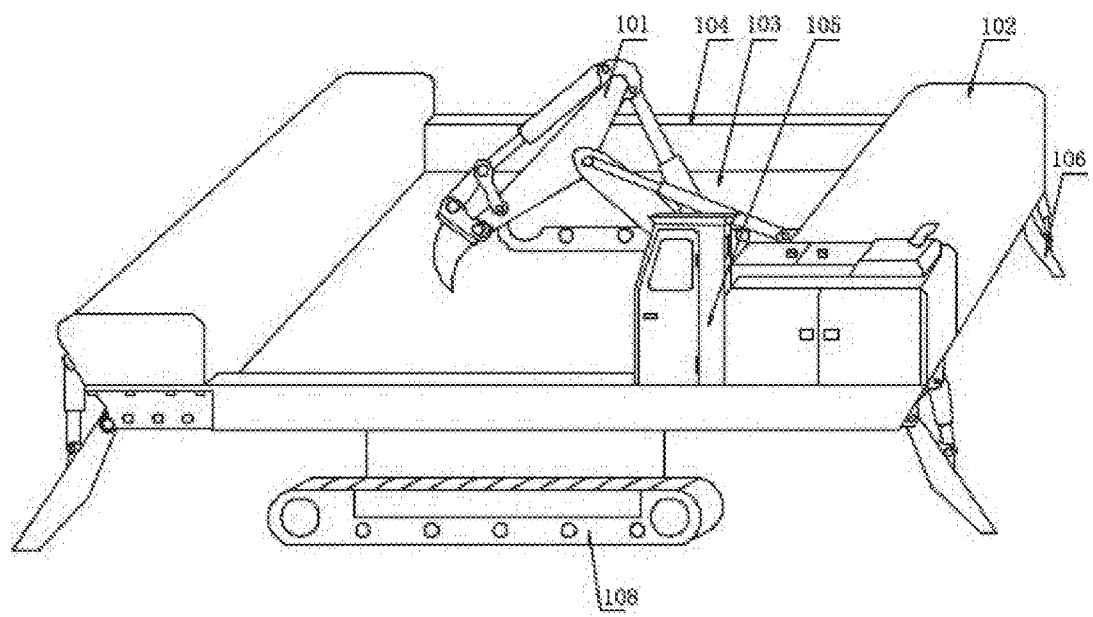
FIG. 1 is a schematic structural diagram of a rock breaker provided by a first embodiment of the present disclosure.
Figure 2:
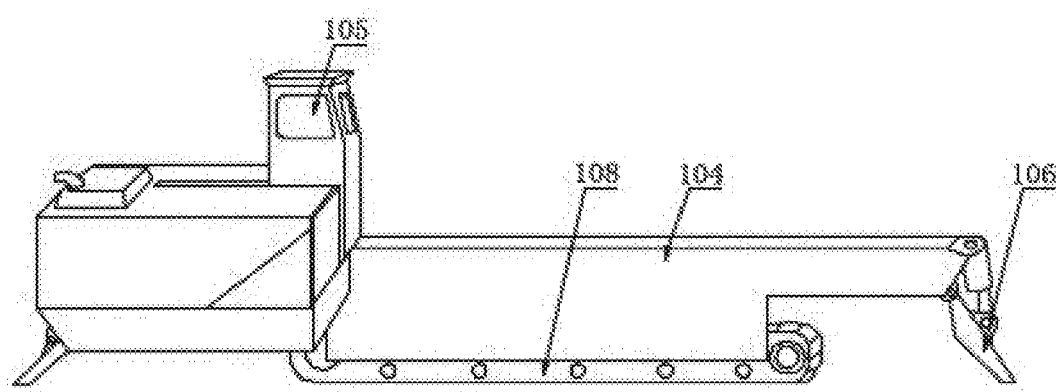
FIG. 2 is a schematic structural diagram showing a connection between a control mechanism and a frame in the first embodiment of the present disclosure.
Figure 3:
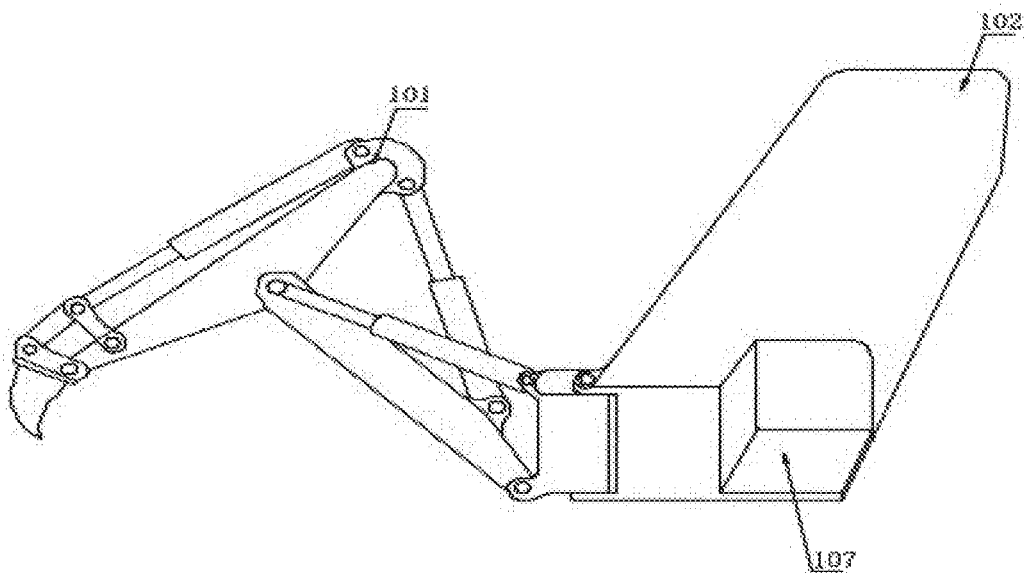
FIG. 3 is a schematic structural diagram of a rock arm and a connection block in the first embodiment of the present disclosure.
Figure 4:
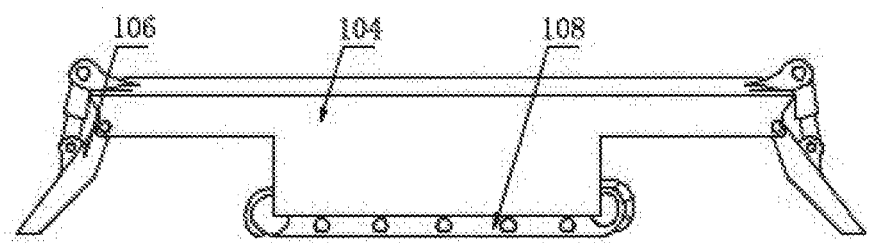
FIG. 4 is a schematic structural diagram of a connection of a hydraulic support mechanism and a frame in the first embodiment of the present disclosure.
Figure 5:
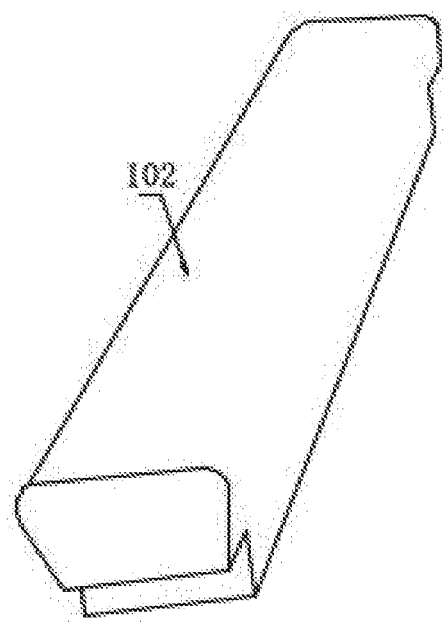
FIG. 5 is a schematic structural diagram of a connection block in the first embodiment of the present disclosure.

Reference numerals: 101—rock arm; 102—connection block, 103—rock breaking working region; 104—frame; 105—control room; 106—support portion; 107—maintenance opening; 108—caterpillar traveling mechanism; 109—access door; 110—weight balancing block; 111—telescoping block.

DETAILED DESCRIPTION

In order to make those skilled in the art better understand the technical solutions of the present disclosure, the technical solutions of the present disclosure will be further described below through embodiments with reference to the accompanying drawings.

First Embodiment

Referring to FIGS. 1 to 6, the present embodiment provides a rock breaker including a vehicle and a rock arm 101. The vehicle is provided with a rock breaking working region 103 penetrating the vehicle in a direction perpendicular to the ground. The area of the rock breaking working region 103 is 7-50 square meters, preferably 30 square meters. The vehicle includes a traveling mechanism, frames 104, and a connection block 102. For example, a number of the frames 104 is preferably two, and a number of the connection blocks 102 is preferably two. The two frames 104 are symmetrically disposed on the traveling mechanism, and the two connection blocks 102 are fixed between the two frames 104. The rock breaking working region 103 refers to a hollow region formed at inner sides of the frames 104 and the connection blocks 102. The expression that the rock breaking working region penetrating the vehicle refers to that the rock breaking working region 103 penetrates the vehicle in a vertical direction to form a hollow region in the vehicle.

In the present embodiment, the rock breaking working region 103 penetrates the vehicle and is disposed in a direction perpendicular to the ground, and this structure allows a working region of the rock arm 101 to fall within a range of the vehicle, which is the largest distinction with the existing rock breaker. The rock breaker adopting the vehicle can fully utilize the weight of the rock breaker to enhance the rock breaking effect of the rock arm 101, and allow the rock arm 101 to perform rock breaking around the gravity center of the rock breaker, which is beneficial to improving the construction efficiency. At the same time, in the case of ensuring a downward shearing force of the rock arm 101, it is possible to minimize the energy loss of useless work without lifting an arm having a relatively large weight, thereby reducing the energy consumption of rock breaking. The present invention is particularly applied to a rock breaker dedicated to crushing rocks, has better energy efficiency ratio and specificity in the rock breaking work of rocks having medium hardness and lower hardness than other construction machines, and is mainly applied to the rock breaking work in a large scale of mining and foundation construction. The vehicle is mainly formed by a traveling mechanism, frames 104 and a connection block 102. This structure makes the whole vehicle form a square body, thereby improving the stability and balance of the vehicle upon breaking rocks. Moreover, the frames 104 can block rock splashing during the rock breaking work, thereby improving the safety of rock breaking. The area of the rock breaking operation area 103 is set to 7-50 square meters, which can be more effectively applied to most mines, is easy for operation, and can achieve the best combination of rock breaking efficiency and walking times, that is, under the premise of reducing the number of walking times, the rock breaking efficiency is improved.

In the present embodiment, the connection block 102 is provided with a rotating member, such as a rotating shaft, configured for connecting the rock arm 101. The rock arm 101 is connected to the connection block 102 by the rotating member such that a rock breaking portion of the rock arm 101 can be freely movable within the rock breaking working region 103, thereby increasing a rock breaking range of the rock arm 101. In the present embodiment, the connecting portion is a rotating shaft, preferably, the rotating shaft is disposed in the middle of a width direction of the entire vehicle, so as to enlarge the rock breaking range of the rock arm 101.

In the present embodiment, an interior of the connection block 102 is provided with a cavity, and an object having a relatively large specific weight, such as barite, is disposed in the cavity as a weight balancing object. The weight balancing object provided in the connection block 102 can improve the stability of the vehicle during rock breaking, be favorable to further enhancing a downward shearing force of the rock arm 101 upon breaking rocks, and have advantages such as convenient transportation and disassembly.

In the present embodiment, a hydraulic support mechanism is disposed under the vehicle, and the hydraulic support mechanism includes four support portions 106, and the four support portions 106 are fixedly connected under the ends of the two frames 104, respectively. During rock breaking work, whether or not to use the hydraulic support mechanism can be determined according to the demand for friction. The hydraulic support mechanism can enhance the stability of the rock breaker upon breaking rocks, and improve the frictional resistance of the rock breaker to the ground upon breaking rocks, so that the rock breaker can obtain the maximum horizontal rock breaking force.

In the present embodiment, the frames 104 are provided with a maintenance opening 107 for maintaining the rock breaker. By using the maintenance opening 107, the maintenance of the rock breaker is more convenient, so that it is beneficial to improving the maintenance speed upon the rock breaker being malfunctioned. The connection block 102 is fixedly connected to the frames 104 through a bolt, so that the stability of the connection block 102 on the frames 104 are better.

In the present embodiment, lower portions of two ends of the connection block 102 are respectively provided with inverted L-shaped steps. Upon the connection block being installed, the two ends of the connection block 102 can be firstly placed on the two frames 104 through the inverted L-shaped steps, and then fixedly connected on the frames 104 through a bolt. The abovementioned configured is preferable, but in the actual application process, there may be various other fixing structures. For example, the two ends of the connection block 102 can be in a sliding connection with the two frames 104, so as to facilitate adjustment of the area of the rock breaking working region 103, and can be fixed after an appropriate rock breaking area is obtained.

The rock breaker provided in the present embodiment further includes a control mechanism. The rock breaking portion of the rock arm 101 can freely move and break rocks in the rock breaking working region 103 through the control mechanism. The control mechanism is fixed to the frames 104. The control mechanism comprises a control room 105, an engine, a fuel tank, a corresponding pipeline and an electric control part, etc., and the control mechanism is configured for controlling movements of the hydraulic support mechanism, the rock arm 101 and the traveling mechanism. In the present embodiment, the hydraulic support mechanism, the rock arm 101 and the traveling mechanism are under the unified control of the control mechanism, thereby achieving intelligent rock breaking and the operation is more convenient.

In the present embodiment, the traveling mechanism can have the following two structures:

1. As shown in FIG. 1, the traveling mechanism includes two sets of caterpillar traveling mechanisms 108, and the two frames 104 are symmetrically connected to the two sets of caterpillar traveling mechanisms 108.

Figure 6:
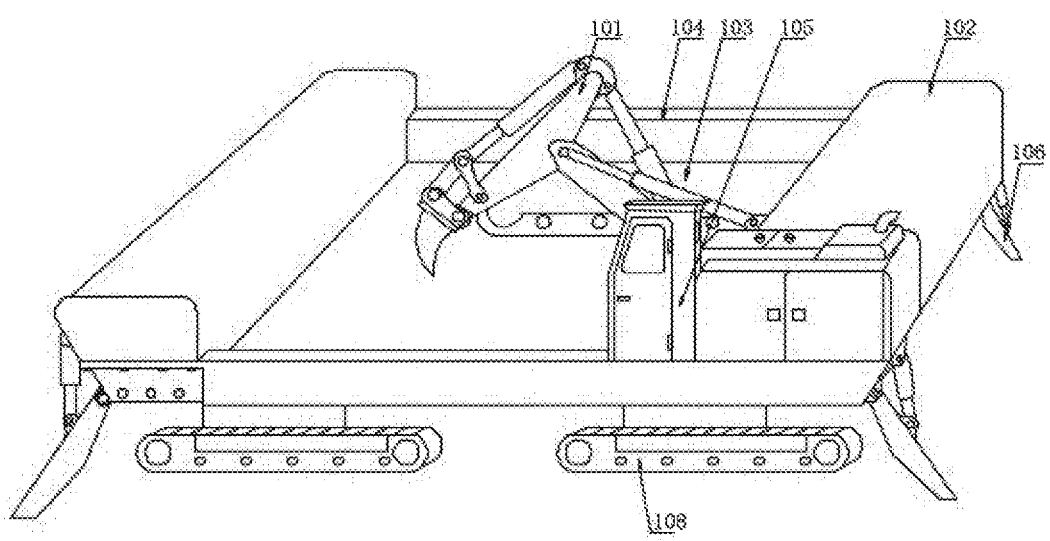
FIG. 6 is a schematic structural diagram of a rock breaker adopting four sets of caterpillar travelling mechanisms provided by the first embodiment of the present disclosure.
Figure 7:
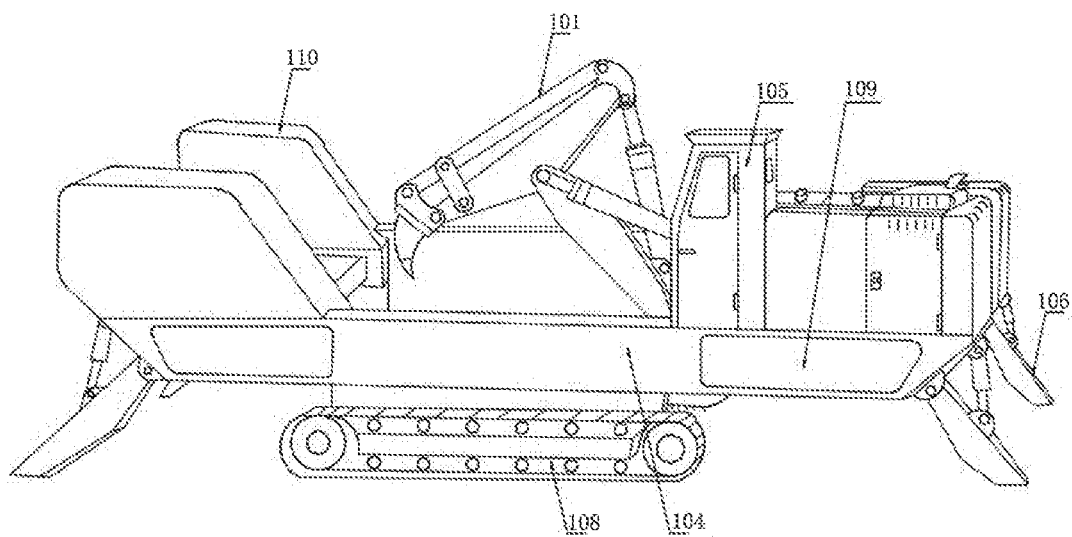
FIG. 7 is a schematic structural diagram of a main view of a rock breaker in which a vehicle is stretched provided by a second embodiment of the present disclosure.
Figure 8:
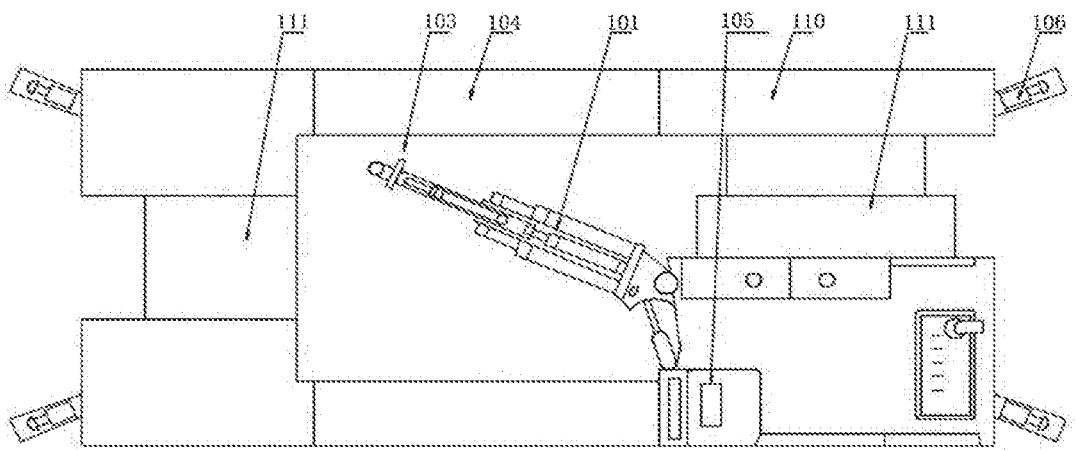
FIG. 8 is a schematic structural diagram of a top view of a rock breaker in which a vehicle is stretched provided by the second embodiment of the present disclosure.
Figure 9:
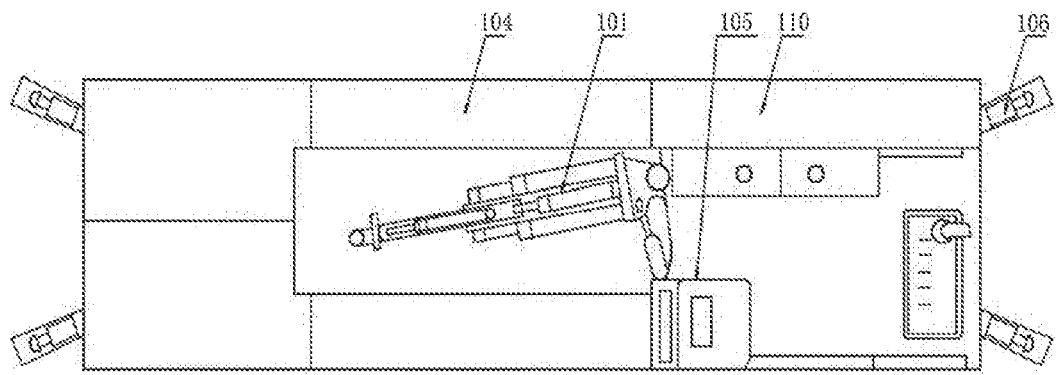
FIG. 9 is a schematic structural diagram of a top view of a rock breaker in which a vehicle is retracted provided by the second embodiment of the present disclosure.
Figure 10:
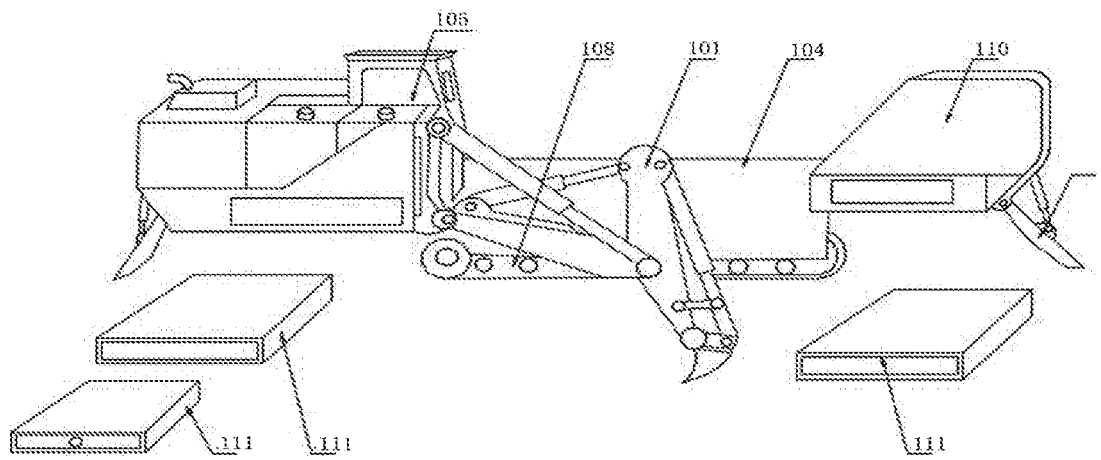
FIG. 10 is a schematic structural diagram of a side view of one of the frames in the second embodiment of the present disclosure.
Figure 11:
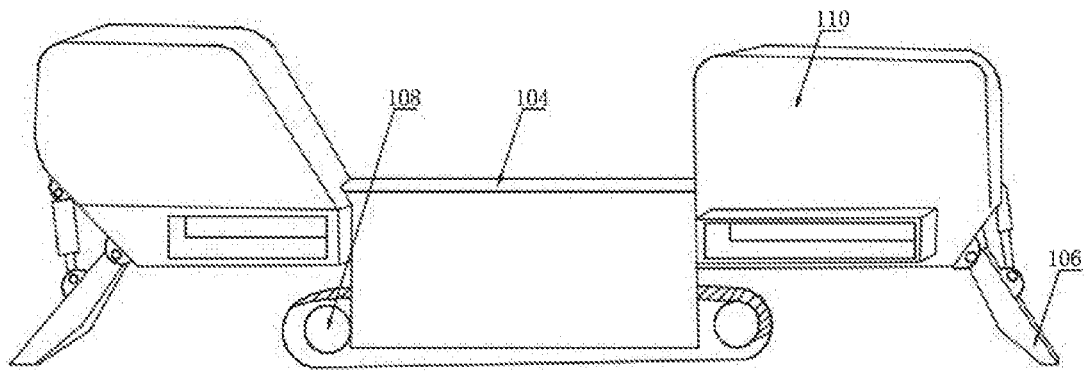
FIG. 11 is a schematic structural diagram of a side view of the other one of the frames in the second embodiment of the present disclosure.

2. As shown in FIG. 6, the traveling mechanism includes four sets of caterpillar traveling mechanisms 108. Each of the two frames 104 is connected to two sets of caterpillar traveling mechanisms 108, and the two frames 104 are symmetrically connected to the four sets of caterpillar traveling mechanisms 108, respectively. The traveling mechanism includes four sets of caterpillar walking mechanisms 108. The structure that the frames 104 are symmetrically connected to four sets of caterpillar traveling mechanisms 108 enables the rock breaker to walk in a rock breaking construction region with a complex terrain and a sinister terrain.

In summary, the rock breaker provided by the embodiment can fully utilize the weight of the rock breaker to enhance the rock breaking effect of the rock arm 101, and allow the rock arm 101 to perform rock breaking around the gravity center of the rock breaker, which is beneficial to improving the rock breaking efficiency. At the same time, in the case of ensuring a downward shearing force of the rock arm 101, it is possible to minimize the energy loss of useless work without lifting an arm having a relatively large weight, thereby reducing the energy consumption of rock breaking.

The present embodiment further provides a rock breaking method, which is implemented by using the rock breaker provided by the present embodiment, and includes the following steps:

A: driving or moving the rock breaker provided with the rock breaking working region 103 to a rock region to be broken through the control mechanism, such that the rock breaking working region 103 is located directly above the rock region to be broken, wherein the rock breaking working region 103 is a hollow region penetrating the vehicle of the rock breaker and perpendicular to the ground;

B: operating the rock arm 101 through the control mechanism to control the rock breaking portion on the rock arm 101 to move downward in the rock breaking working region 103;

C: the rock breaking portion of the rock arm 101 breaks a rock in the rock breaking working region 103.

Further, in the step A, after the rock breaking operation area 103 being located above the rock region to be broken, the rock breaker is supported by the hydraulic support mechanism.

Second Embodiment

Referring to FIGS. 7-11, the present embodiment provides a rock breaker. The rock breaker provided in the present embodiment is substantially the same as the rock breaker provided in the first embodiment. What makes the rock breakers different is that, in the rock breaker provided in the present embodiment, the connection block 102 is replaced by a telescoping mechanism. The two frames 104 are connected by telescoping mechanisms. There are two sets of telescoping mechanisms, and the two sets of telescoping mechanisms are disposed between the two frames 104. The rock breaking working region 103 refers to a hollow region formed at inner sides of the frames 104 and the telescoping mechanism of the vehicle. The expression that the rock breaking working region penetrating the vehicle refers to that the rock breaking working region 103 penetrates the vehicle in a vertical direction to form a hollow region in the vehicle. By controlling a telescoping distance of the telescoping mechanism, the area of the rock breaking working region 103 can be flexibly adjusted. In the present embodiment, the area of the rock breaking working region 103 can be adjusted within 6-30 square meters, so that the rock breaker can break rocks in different terrains and environments, and upon the telescoping mechanism being shrunken, it is also favorable to the transportation of the rock breaker.

The telescoping mechanism includes a cylinder and a telescoping block 111. Two ends of the telescoping block 111 are respectively in a sliding connection with the two frames 104. The cylinder is fixed on one of the two frames 104, and a piston rod of the cylinder is fixedly connected with the other one of the two frames 104, and the cylinder is located above a corresponding one of the telescoping blocks 111. For example, each of the two frames 104 is provided with two sliding slots, the sliding slots on the two frames 104 are provided on opposite sides of the two frames 104, and the sliding slots on the two frames 104 are symmetrical. Two ends of the telescoping block 111 in each of the two sets of telescoping mechanisms are respectively located in the sliding slots of the two frames 104, and a limiting member for preventing the telescoping block 111 from being detached from the sliding slot is disposed between the telescoping block 111 and the sliding slot, so that the stretching and shrinking of the vehicle can be achieved by the cooperation of the cylinder and the telescoping block 111. In the present embodiment, the telescoping mechanism mainly includes a cylinder and a telescoping block 111, so that the telescoping mechanism is easy to manufacture, which is favorable to reducing the preparation costs of the entire rock breaker, and the production design is convenient, the use is reliable, and the stretching and shrinking is more stable.

Furthermore, the number of the telescoping block 111 in the telescoping mechanism is at least one. In a case where the number of the telescoping block 111 is greater than one in the telescoping mechanism, adjacent two telescoping blocks are in a sliding connection with each other, i.e., one of the telescoping blocks 111 is slidably sleeved on another one of the telescoping blocks 111. In the present embodiment, preferably, the number of the telescoping blocks 111 in one of the two sets of telescoping mechanisms is one, and the number of the telescoping blocks 111 in the other one of the two sets of telescoping mechanisms is two.

In the present embodiment, the rock arm 101 is connected to the vehicle through a rotating shaft. For example, the rock arm 101 is connected to one of the two frames 104 through a rotating shaft.

In the present embodiment, the frames 104 are further provided with an access door 109, and the number of the access doors 109 is two, which are respectively used for the maintenances of the two sets of telescoping mechanisms.

In the present embodiment, three weight balancing blocks 110 are fixed on the vehicle, and the three weight balancing blocks 110 are respectively fixed on the two frames 104. Of course, the number of the weight balancing blocks 110 may also be greater than three, preferably, the weight balancing block 110 is barite, and the number and shape of the weight balancing block 110 can be determined according to actual conditions. In the present embodiment, the weight balancing block 110 can enhance the stability of the rock breaker upon breaking rocks, and also can improve a downward shearing force of the rock arm 101 to the rocks, thereby facilitating improving the rock breaking efficiency. Further, the three weight balancing blocks 110 are structures respectively disposed on the two frames 104, so that the rock breaker can form a relatively regular entirety in a case where the telescoping mechanisms are shrunken and the rock breaker does not move, which is convenient for quick disassembly and assembly and satisfies the transportation requirements; and after the telescoping mechanism is stretched, the rock arm 101 can perform rock breaking around the gravity center of the rock breaker, which is beneficial to improving the rock breaking effect.

In the present embodiment, the control mechanism is used to control the hydraulic support mechanism, the rock arm 101, the telescoping mechanism, and the traveling mechanism. The hydraulic support mechanism, the rock arm 101 and the traveling mechanism are under the unified control of the control mechanism, thereby achieving intelligent rock breaking and the operation is more convenient.

In summary, the rock breaker provided in the present embodiment can flexibly adjust the area of the rock breaking working region 103 by controlling the telescoping distance of the telescoping mechanism, so that the rock breaker can break rocks in different terrains and environments, and upon the telescoping mechanism being shrunken, it also favorable to the transportation of the rock breaker.

The embodiment further provides a rock breaking method, which is implemented by using the rock breaker provided by the present embodiment, and includes the following steps:

A: driving or moving the rock breaker provided with the rock breaking working region 103 to a rock region to be broken through the control mechanism, such that the rock breaking working region 103 is located directly above the rock region to be broken, wherein the rock breaking working region 103 is a hollow region penetrating the vehicle of the rock breaker and perpendicular to the ground; adjusting an area of the rock breaking working region 103 through the telescoping mechanism;

B: operating the rock arm 101 through the control mechanism to control the rock breaking portion on the rock arm 101 to move downward in the rock breaking working region 103;

C: the rock breaking portion of the rock arm 101 breaks a rock in the rock breaking working region 103.

Further, in the step A, after the rock breaking operation area 103 being located above the rock region to be broken, the rock breaker is supported by the hydraulic support mechanism.

It is apparent that the above-described embodiments of the present disclosure are merely illustrative of the present disclosure and are not intended to limit the embodiments of the present invention. Other variations or modifications of various forms may be made by those skilled in the art in light of the abovementioned description. There is no need and no way to exhaust all of the implementations. Any modifications, equivalent substitutions and improvements made within the spirit and scope of the present disclosure are intended to be included within the protection scope of the accompanying claims.

INDUSTRIAL APPLICABILITY

The rock breaker provided by the invention can fully utilize the weight of the rock breaker to enhance the rock breaking effect of the rock arm, and allow the rock arm to perform rock breaking around the gravity center of the rock breaker, which is beneficial to improving the rock breaking efficiency. At the same time, in the case of ensuring a downward shearing force of the rock arm, it is possible to minimize the energy loss of useless work without lifting an arm having a relatively large weight, thereby reducing the energy consumption of rock breaking. By controlling telescoping distance of a telescoping mechanism, the area of the rock breaking working region can be flexibly adjusted, so that the rock breaker can break rocks in different terrains and environments, and upon the telescoping mechanism being shrunken, it is also favorable to transportation of the rock breaker.

What is claimed is:

1. A rock breaker, comprising a rock arm and a vehicle, wherein the vehicle is provided with a rock breaking working region penetrating the vehicle in a direction perpendicular to a ground, wherein the vehicle comprises a traveling mechanism and frames, and the frames are symmetrically disposed on the traveling mechanism, the vehicle comprises a connection block, the connection block is fixed between the frames and is rigidly connected with the frames, one connection block is configured for connecting the rock arm, the rock breaking working region is a hollow region formed at inner sides of the frames and the connection block, and a working region of the rock arm is within the rock breaking working region.

2. The rock breaker according to claim 1, wherein the traveling mechanism comprises two sets of caterpillar traveling mechanisms, the frames are symmetrically connected to the two sets of caterpillar traveling mechanisms.

3. The rock breaker according to claim 1, wherein the traveling mechanism comprises four sets of caterpillar traveling mechanisms, the frames are symmetrically connected to the four sets of caterpillar traveling mechanisms.

4. The rock breaker according to claim 1, wherein the connection block is provided with a rotating member configured for connecting the rock arm.

5. The rock breaker according to claim 1, wherein the connection block is provided with a maintenance opening.

6. The rock breaker according to claim 1, wherein the connection block is provided with a weight balancing object.

7. The rock breaker according to claim 1, wherein the rock breaking working region has an area of 7 to 50 square meters.

8. The rock breaker according to claim 1, wherein the rock arm comprises a big arm and a small arm, the big arm is connected to the connection block, a big arm cylinder is connected between the big arm and the connection block, the small arm is connected to an end of the big arm away from the connection block, a small arm cylinder is provided between the small arm and the big arm, one end of the small arm cylinder is hinged with the small arm and the other end of the small arm cylinder is hinged with the big arm; one end of the small arm away from the big arm is hinged with a rock breaking portion; a rock breaking cylinder is provided between the small arm and the rock breaking portion, one end of the rock breaking cylinder is hinged with the small arm and the other end of the rock breaking cylinder is hinged with the rock breaking portion.

9. The rock breaker according to claim 8, further comprising a hydraulic support mechanism and a control mechanism, the control mechanism is fixed to an upper portion of the vehicle, the hydraulic support mechanism is fixed to a lower portion of the vehicle, the control mechanism is configured for controlling movements of the hydraulic support mechanism, the rock arm and the traveling mechanism.

\* \* \* \* \*